United States Patent [19]

Ahne et al.

[11] Patent Number: 4,965,134

[45] Date of Patent: Oct. 23, 1990

[54] METHOD FOR MANUFACTURING HIGHLY HEAT-RESISTANT DIELECTRICS

[75] Inventors: Hellmut Ahne, Roettenbach; Albert Hammerschmidt, Erlangen, both of Fed. Rep. of Germany

[73] Assignee: Siemens Aktiengesellschaft, Berlin & Munich, Fed. Rep. of Germany

[21] Appl. No.: 191,388

[22] Filed: May 9, 1988

[30] Foreign Application Priority Data

May 18, 1987 [DE] Fed. Rep. of Germany ....... 3716630

[51] Int. Cl.$^5$ .......................... B32B 9/04; B05D 5/12
[52] U.S. Cl. .................................... 428/411.1; 427/96; 427/240; 427/393.6; 427/385.5; 427/58; 428/474.4; 437/231
[58] Field of Search ...................... 427/96, 240, 385.5, 427/393.6; 428/411.1, 474.4; 437/231

[56] References Cited

U.S. PATENT DOCUMENTS

| | | | |
|---|---|---|---|
| 2,904,537 | 9/1959 | Brinker et al. | 264/78 |
| 3,332,907 | 7/1967 | Angelo et al. | 260/47 |
| 3,644,288 | 2/1972 | Odier et al. | 260/47 CP |
| 3,852,239 | 2/1974 | Bellmann | 360/46.5 R |
| 4,305,112 | 2/1984 | Heywang et al. | 361/286 |
| 4,347,306 | 8/1982 | Takeda et al. | 427/96 |

FOREIGN PATENT DOCUMENTS 1142071  2/1969  United Kingdom .

OTHER PUBLICATIONS

Watari et al., "Packaging Technology for the NEC SX Supercomputer", 35th Electronic Components Conference, Washington U.S.A., May 1985, Report of the conference, pp. 192–198.

*Primary Examiner*—Janyce Bell
*Attorney, Agent, or Firm*—Kenyon & Kenyon

[57] ABSTRACT

A method for manufacturing highly heat resistant dielectrics is provided wherein an oligomeric and/or polymeric hydroxypolyamide is dissolved in an organic solvent and then applied to a substrate. The solvent is removed and the hydroxypolyamide is converted into a polybenzoxazole by annealing at a temperature of between 200° to 500° C. The resulting dielectrics are stable up to 550° C. and have a continuous temperature resistance of more than 3 hours at 470° C. The dielectrics are particularly well suited for applications in microelectronics.

18 Claims, No Drawings

METHOD FOR MANUFACTURING HIGHLY HEAT-RESISTANT DIELECTRICS

BACKGROUND OF THE INVENTION

The invention relates to a method for manufacturing highly heat-resistant dielectrics on the basis of organic polymers on a substrate.

Organic dielectrics are non-conducting substances used primarily in microelectronics as planarizing insulating layers and as passivating layers in the manufacture of components, for instance, in the multilayer wiring of integrated circuits (ICs). The planarizing properties are required in order to abate the unevenness of the surface of the substrate which results from successive process steps, thereby making possible a secure multilayer construction.

Dielectrics of the above mentioned type which serve as passivating insulating layers between conducting and/or semiconducting materials, remain in the components and must therefore meet a number of requirements. First, these insulating layers must exhibit high-temperature resistance so that they can be used in modern methods such as sputtering, dry etching, plasma etching and reactive ion etching which, in part, require high temperatures. They should also exhibit good electrical properties such as a low dielectric constant and a small loss angle. In addition, these insulating layers should exhibit low moisture absorption, be resistant against alkaline developers and have the capability to be produced with high purity so that they contain ionic impurities only in the ppm or sub-ppm range. These properties are required since high moisture absorption has a negative influence on the electrical characteristics of the insulating layers and ionic impurities have an adverse influence upon the electrical characteristics, the reliability in the components, and the moisture behavior of the layers.

Conventional temperature-resistant organic insulating layers (i.e., dielectrics typically consist of polymers on the basis of polyimides (see, for instance: "35th Electronic Components Conference", Washington, U.S.A., May 20 to 22 (1985)-Conference Support 1985, pages 192 to 198). For manufacturing high-temperature resistant layers one generally starts out with polymer precursor stages in the form of soluble polyamidocarboxylic acids which are applied to the substrate and are subsequently converted into polyimides by an annealing process (see in this connection: DE-OS 28 48 034).

However, polyimides have only little resistance against alkaline developers. They are actually decomposed by alkali. In addition, they exhibit a relatively high moisture absorption (3.8% for a relative moisture of 0% to 100%, at 25° C.), mainly due to their polar carbonyl groups. The electrical characteristics of polyimides are also not satisfactory: dielectric constant $\epsilon$ (at 25° C., 0% relative humidity)=3.35; loss angle tan $\delta$ (at 25° C., 0% relative humidity)=4.1×10$^{-3}$, tan $\delta$ (at 25° C., 100% relative humidity)=15×10$^{-3}$.

It is an object of the invention to develop a method for manufacturing organic dielectrics on a substrate in which the dielectrics exhibit a high temperature resistance, good electrical properties, resistance to alkali, low moisture absorption and high purity.

Summary of the Invention

According to the invention, an oligomeric and/or polymeric hydroxypolyamide is dissolved in an organic solvent and applied to a substrate. The solvent is removed and the hydroxypolyamide is converted into a polybenzoxazole by annealing at a temperature of between 200° and 500° C.

Detailed Description of the Invention

The dielectrics manufactured according to the method of the invention are organic polymers in the form of polybenzoxazoles. These dielectrics are stable up to 550° .C and have a continuous temperature resistance of more than 3 hours at 470° C. Therefore, when the dielectrics are subjected to annealing processes at temperatures of up to 450° C. (which are often necessary for stabilizing certain semiconductor characteristics), harmful outgassing results from partial decomposition is avoided. Because of this enhanced temperature resistance modern ion implantation methods, sputtering processes and dry etching methods can be used when the dielectrics of the invention are employed. These dielectrics are therefore particularly well suited for applications in microelectronics.

The dielectrics based upon polybenzoxazole have good electrical properties in comparison to dielectrics based upon polyimide. The dielectrics of the invention even exhibit distinctly improved and lower electrical characteristics: $\epsilon$ (at 25° C., 0% relative humidity)=2.7; tan $\delta$ (at 25° C., 0% relative humidity)=1.8×10$^{-3}$; tan $\delta$ (at 25° C., 100% relative humidity)=7.8×10$^{-3}$. They also absorb less moisture: moisture absorption (at 0 to 100% relative humidity)=1.7% (at 25° C.). In addition, these dielectrics have excellent resistance against acids, alkali and a large number of solvents. The resistance to alkali is of particular importance.

Polybenzoxazoles are generally soluble only in solvents which cannot be employed in the field of microelectronics such as concentrated sulfuric acid and polyphosphoric acid. The dielectrics according to the invention are therefore prepared from polymer precursor stages which are soluble in organic solvents. Hydroxypolyamides are suitable polymer precursors for the preparation of the dielectrics of the invention. The polymer precursor stages are then converted into high temperature-resistant polybenzoxazoles by an annealing process at temperatures between 200° and 500° C.

In the method according to the invention, it is preferred that the polymer precursor stages have high storability and good processability. These soluble precursor stages, i.e., the hydroxypolyamides, are dissolved in organic solvents and applied to the substrate in a suitable manner. Preferred solvents are N-methylpyrrolidone, N,N-dimethylacetamide or a mixture thereof. However, other solvents with similar properties can also be used.

The solution of the polymer precursor stage is preferably applied to the substrate by means of a centrifuging technique. However, other coating methods can also be used such as immersion, spraying, brushing, rolling. The concentration of the polymer precursor stage in the solution is between 3 and 60% by weight and is preferably between 10 and 40% by weight. In this manner, layer thicknesses between 0.05 and several 100 $\mu$m can be generated. For example, by centrifugal coating it is possible to obtain a uniformly good surface quality with speeds of 300 to 10,000 rpm.

When the solution of the polybenzoxazole precursor stage is applied to the substrate, additives for improving the adhesion to the substrate and/or the wetting may be added to the solution. Such additives, i.e., adhesion promoters or wetting agents, can also be applied directly to the substrate, before the solution is applied.

After the solution is applied to the substrate, the solvent is removed, i.e., it is dried. This can take place at room temperature or at an elevated temperature; preferably, the solvent is removed at a temperature between 50° and 120° C. The solvent may also be removed in a vacuum.

After the drying step, the material applied to the substrate is annealed at temperatures between 200° and 500° C. Preferably the anneal takes place at a temperature between 300° and 400° C. The annealing process itself is generally carried out for a period of 0.5 to 8 hours and preferably for 1 to 4 hours.

In the method according to the invention, polycondensation products are used as hydroxypolyamides, for example,
- co-polycondensation products of aromatic diaminodihydroxy compounds and aromatic dicarboxylic acids or dicarboxylic acid chlorides,
- homopolycondensation products of aromatic aminohydroxycarboxylic acids, and
- copolycondensation products of aromatic diaminodihydroxy compounds, aromatic dicarboxylic acids or dicarboxylic acid chlorides and aromatic aminohydroxycarboxylic acids.

Hydroxypolyamides of the kind mentioned above have in general the following structure:

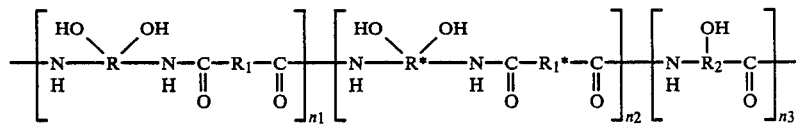

where $n_1 = 1$ to 100, $n_2 = n_3 = 0$, or
$n_3 = 1$ to 100, $n_1 = n_2 = 0$, or
$n_1$ and $n_3 = 1$ to 100, $n_2 = 0$, or
$n_1$ and $n_2 = 1$ to 100, $n_3 = 0$ (with $R \neq R^*$ and/or $R_1 \neq R_1^*$)

R and R* can have the following meaning:

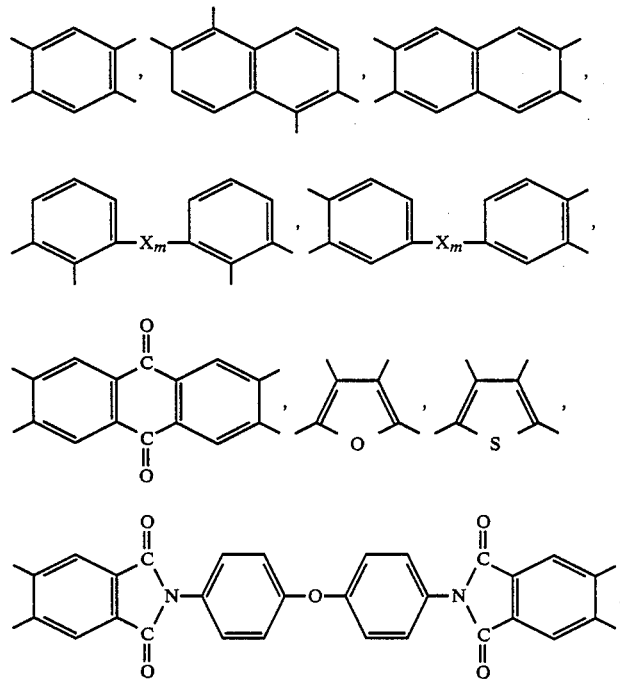

$R_1$ and $R_1$* can have the following meaning where H-atoms can also be substituted by Cl or Br:

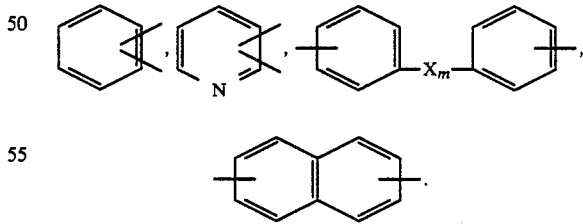

$R_2$ can have the following meaning:

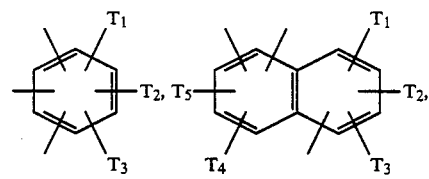

-continued

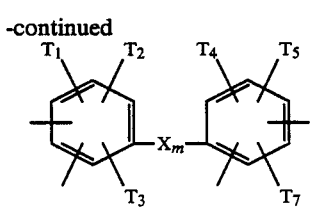

Here, $T_1$ to $T_7$ mean H or alkyl, m = 0 or 1, and X means:

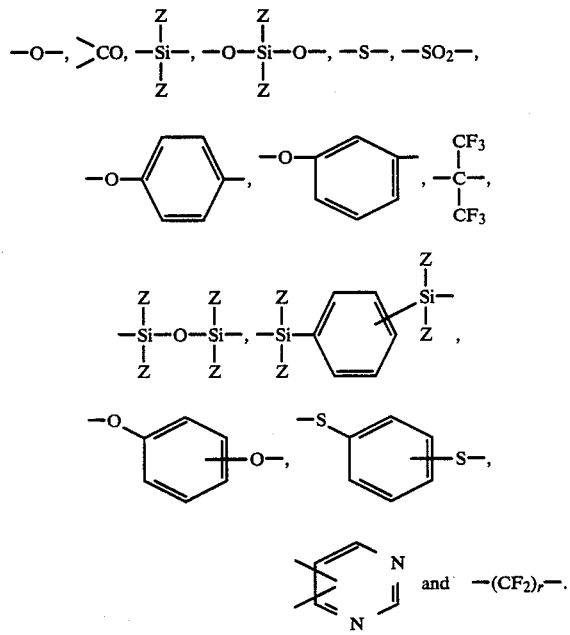

Here, the following applies:
Z=alkyl with 1 to 10 carbon atoms or aryl, and
r=2 to 18.

For the preparation of the dielectrics in the method according to the invention preferably precursor stages of polybenzoxazoles in the form of oligomeric and/or polymeric hydroxypolyamides of the following kind are used:
- Polycondensation products of 3,3'-dihydroxybenzidine and isophthalic acid dichloride,
- Polycondensation products of 3,3'-dihydroxybenzidine, 2,2-bis(3-amino-4-hydroxyphenyl)-1,1,1,3,3,3-hexafluoropropane and isophthalic acid dichloride,
- Polycondensation products of 3,3'-dihydroxybenzidine and bis(4-chlorocarbonylphenyl)-dimethylsilane, and
- Polycondensation products of 3-amino-4 hydroxybenzoic acid.

As a diaminodihydroxy compound isomers of 3,3'-dihydroxybenzidine can also be used as well as other hydroxyl-group containing aromatic diamines such as 3,3'-dihydroxy-4,4'-diamino diphenyl ether. As the dicarboxylic acid, besides isophthalic acid dichloride isophthalic acid itself can be used. Terephthalic acid or terephthalic acid dichloride can also serve as the dicarboxylic acid.

3-amino-4-hydroxy benzoic acid is a preferred aminohydroxy carboxylic acid. However, the following compounds can also be used: 3-amino-4-hydroxy-4'-carboxy biphenyl, 4-amino- 3-hydroxy-4'-carboxydiphenyl ether, 4-amino-3-hydroxy 4'-carboxy benzophenone, 4-amino-3-hydroxy-4'-carboxy-diphenyl sulfone and 4-amino-3-hydroxyphenyl-4'-carboxyphenyl-1,1,1,3,3,3-hexafluoropropane. Isomers Of these compounds can also be used.

The highly heat resistant organic dielectrics prepared by the method of the invention can be used in: the preparation of passivating layers on semiconductor components, the preparation of thin-film and thick-film circuits, the preparation of insulating layers as a part of multilayer circuits, and the preparation of miniaturized insulating layers on electrically conducting and/or semiconducting and/or insulating base materials. The dielectrics are especially useful in the field of microelectronics, where the insulating layers can remain in the components. In general, the dielectrics can be used for the permanent coating of surfaces, as planarizing protective and insulating layers in electrotechnology and electronics, or as orientation layers in liquid-crystal displays.

The invention will be explained in further detail by means of the following embodiment examples.

EXAMPLE 1

Synthesis of 2,2-bis (3-amino-4-hydroxyphenyl-1,1,1,3,3,3-hexafluoropropane

A solution of 32 parts by weight concentrated nitric acid in 472 parts by weight glacial acetic acid is added drop by drop to a solution of 50.4 parts by weight 2,2-bis-(4-hydroxyphenyl)-1,1,1,3,3,3-hexafluoropropane in 472 par weight glacial acetic acid. The solution is added for a period of 3 hours while stirring at 20° to 25° C. After 12 hours, the reaction solution is poured into 4 liters of distilled water. The precipitated 2,2-bis (4-hydroxy-3-nitrophenyl)-1,1,1,3,3,3-hexafluoropropane is separated, comminuted, washed with much water and dried in a vacuum.

30 parts by weight 2,2-bis (4-hydroxy-3-nitrophenyl)-1,1,1,3,3,3-hexafluoropropane are suspended in a mixture of 240 parts by weight ethanol and 120 parts by weight water. 1.5 parts by weight Raney nickel and two times 18.5 parts by weight hydrazine hydrate are added to the suspension, and subsequently, the mixture is heated for the reflux. After the development of hydrogen has abated at the end of about 4 hours, suction is applied to remove the Raney nickel and the ethanol/water mixture is removed in a vacuum. The residue is taken up with about 400 parts by weight of diluted hydrochloric acid and optionally filtered off from insoluble components. After the addition of sodium acetate and sodium carbonate, the 2,2-bis (3-amino-4- hydroxy phenyl)-1,1,1,3,3,3-hexafluoropropane is precipitated; the yield is approximately 66%. Analysis (reported/found) revealed the following data: C 49.2%/49.0%; H 3.3%/3.4%; N 7.7%/7.5%; F 31.1%/31.0%; $^1$H-NMR in $d_6$-DMSO: $\delta$ (ppm)=9.2 (2H,s,OH), 6.6 (6H, m,aromatic), 4.6 (4 H, s, —NH$_2$).

EXAMPLE 2

Preparation of a polymer precursor stage by Co-polycondensation 10.8 parts by weight 3.3'-dihydroxybenzidine and 18.3 parts by weight 2,2-bis (3-amino-4-hydroxyphenyl)-1,1,1,3,3,3-hexafluoropropane are dissolved in 220 parts by weight N.N-dimethyl acetamide and treated with a cationic ion exchanger. After adding 40 parts by weight pyridine (see "Polymer Letters", Vol. 2, (1964), pages 655 to 659), 17.2 parts by weight of freshly distilled isophthalic acid dichloride, dissolved in 75 parts by weight cyclohexanone are added drop-wise to the resulting solution at 0° C. After stirring for 3 hours and letting it sit at room temperature for 12 hours, the polymer is precipitated by the drop-wise addition into approximately 4 liters of deionized water. The product is suctioned off, washed with much water and dried in a vacuum. For purification, 20 parts by weight of the polymer are dissolved in about 200 parts by weight N-methylpyrrolidone and treated with an anion exchanger. After again precipitating in deionized water, suction is applied, the substance is washed with much water and dried in a vacuum.

EXAMPLE 3

Preparation of a Polymer Precursor Stage by Homo Polycondensation 10 parts by weight 3-amino-4-hydroxy benzoic acid and 20.4 parts by weight triphenyl phosphine are dissolved in 160 parts by weight pyridine and 23.3 parts by weight hexachloroethane are added (see "Macromolecules", Vol. 18 (1985), pages 616 to 622). After the end of the reaction, the supernated pyridine solution is separated. The polymer is taken up with about 150 parts by weight methanol, precipitated with 800 parts by weight acetone, suctioned off, washed again with acetone and dried in a vacuum. For purification, 5 parts by weight of the polymer are dissolved in 50 parts by weight methanol, precipitated in acetone or acetic ester, suctioned off and dried.

EXAMPLE 4

Preparation of a Layer of an Organic Highly Temperature Resistant Dielectric 5 parts by weight of a polycondensation product of isophthalic acid dichloride and 3,3,-dihydroxy benzidine are dissolved in a mixture of 10 parts by weight N,N-dimethyl acetamide and 10 parts by weight N-methylpyrrolidone and pressure-filtered by a 0.8 μm filter. The finished solution is then centrifuged onto a silicon disc at 600 rpm for 8 seconds and is dried for 30 minutes at 70° C. in a circulating-air oven (layer thickness: 9.65 μm). Annealing at 430° C. for two hours yields the desired highly temperature-resistant dielectric (layer thickness: 7.24 μm; -ε (at 25° C., 0% r.h.)=2.7; tan δ (at 25° C.,0% r.h.)=1.8×10$^{-3}$).

EXAMPLE 5

Preparation of a Layer of an Organic Fluorine-Containing Dielectric Which is Stable at High Temperatures 5 parts by weight of the polymer prepared according to Example 2 are dissolved in 15 parts by weight N-methylopyrrolidone and pressure filtered through a 0.8 μm filter. The completed solution is then centrifuged on a silicon wafer for 20 seconds at 2300 rpm and is dried for 2 hours at 65° C. in a circulating-air oven, whereby a layer thickness of 2.43 μm is obtained. An annealing treatment in a diffusion oven for 4 hours at 400° C. yields the desired high-temperature resistant dielectric (layer thickness: 1.72 μm; ε (at 25° C., 0% r.h.)=2.9; tan δ (at 25° C., 100% r.h.)=7.8×10$^{-3}$).

EXAMPLE 6

Preparation of a Layer of an Organic Silicon-Containing, High-Temperature Resistant Dielectric 1 part by weight of a polymer precursor stage of 1 part by weight bis-(4-chlorocarbonylphenyl)-dimethyl silane and 1.2 parts by weight 3,3,'-dihydroxy benzidine is dissolved in 4 parts by weight N-methylpyrrolidone and is filtered through a 0.8 μm filter. The completed solution is then centrifuged onto a silicon wafer for 20 seconds at 2000 rpm and is dried for 25 seconds at 70° C. (layer thickness: 5.4 μm). Then, annealing takes place in a diffusion oven in nitrogen for 1 hour at 170° C., 1 hour at 300° C. and 0.5 hour at 400° C., whereby the desired high-temperature resistant dielectric is produced (layer thickness: 4.1 μm; moisture absorption (at 0% to 100% relative moisture) is less than 1.7%.

What is claimed is:

1. A method for manufacturing highly heat-resistant dielectrics, based upon organic polymers, on a substrate, comprising the steps of applying a polybenzoxazole precursor which is dissolved in an organic solvent, to the substrate; removing the solvent; and annealing the polybenzoxazole precursor at a temperature between 200° and 500° C., whereby the polybenzoxazole precursor is converted into a polybenzoxazole, wherein the polybenzoxazole precursor has the following structure:

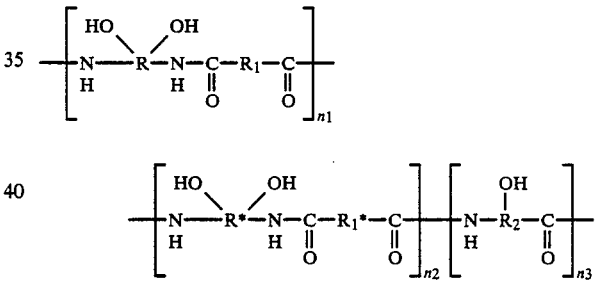

where R, R*, $R_1$, $R_1$* and $R_2$ are aromatic residues and where: $n_3 = 1$ to 100, $n_1 = n_2 = 0$, or $n_1$ and $n_3 = 1$ to 100, $n_2 = 0$.

where R, R*, $R_1$, $R_1$* and $R_2$ are aromatic residues and where: $n_3=1$ to 100, $n_1=n_2=0$, or $n_1$ and $n_3=1$ to 100, $n_2=0$ 2. A method according to claim 1, wherein a polycondensation product of an aromatic amino-hydroxy carboxylic acid is used as the polybenzoxazole precursor.

3. A method according to claim 2, wherein a polycondensation product of 3-amino-4-hydroxybenzoic acid is used as the polybenzoxazole precursor.

4. A method according to claim 1, wherein a polycondensation product of an aromatic diaminodihydroxy compound, an aromatic dicarboxylic acid or a dicarboxylic acid chloride, and an aromatic aminohydroxy carboxylic acid is used as the polybenzoxazole precursor.

5. A method according to claim 2, wherein the annealing takes place at a temperature between 300° and 400° C.

6. A method according to claim 1, wherein the annealing takes place within a time of 0.5 to 8 hours.

7. A method according to claim 1, wherein the solvent is at least one of N-methylpyrrolidone and N,N-dimethyl acetamide.

8. A method according to claim 1, further comprising the step of adding at least one of an adhesion agent and a wetting agent to the solution of the polybenzoxazole precursor.

9. A method according to claim 1, wherein the solution of the polybenzoxazole precursor is applied to the substrate by means of a centrifuging technique.

10. A method according to claim 1, wherein the solvent is removed at a temperature of between 50° and 120° C.

11. A method according to claim 1, wherein the annealing takes place at a temperature between 300° and 400° C.

12. A method according to claim 11 characterized by the feature that the annealing take place within a time of 0.5 to 8 hours.

13. A method according to claim 12 characterized by the feature that the annealing takes place within a time of 1 to 4 hours.

14. A method according to claim 11 wherein the solvent is at least one of N-methylpyrrolidone and N,N-dimethyl acetamide.

15. A method according to claim 11 further comprising the step of adding at least one of an adhesion agent and a wetting agent, to the solvent.

16. A method according to claim 15 characterized by the feature that the solution of the polybenzoxazole precursor is applied to the substrate by means of a centrifuging technique.

17. A method according to claim 11 characterized by the feature that the solvent is removed at a temperature of between 50° and 120° C.

18. A permanent coating for the surface of a substrate comprising a highly heat resistant dielectric on said substrate produced according to the method of claim 1.

* * * * *